(12) United States Patent
Hauptmann et al.

(10) Patent No.: US 10,837,497 B2
(45) Date of Patent: Nov. 17, 2020

(54) HIGH ENERGY DISSIPATION TORSIONAL VISCOUS DAMPER

(71) Applicant: LO-REZ VIBRATION CONTROL LTD., Vancouver (CA)

(72) Inventors: Edward G. Hauptmann, West Vancouver (CA); Richard A. Hordyk, Surrey (CA)

(73) Assignee: LO-REZ Vibration Control Ltd., Vancouver (CA)

( * ) Notice: Subject to any disclaimer, the term of this patent is extended or adjusted under 35 U.S.C. 154(b) by 0 days.

(21) Appl. No.: 16/334,291

(22) PCT Filed: Sep. 15, 2017

(86) PCT No.: PCT/CA2017/051090
§ 371 (c)(1),
(2) Date: Mar. 18, 2019

(87) PCT Pub. No.: WO2018/049530
PCT Pub. Date: Mar. 22, 2018

(65) Prior Publication Data
US 2019/0211882 A1 Jul. 11, 2019

Related U.S. Application Data

(60) Provisional application No. 62/495,503, filed on Sep. 16, 2016.

(51) Int. Cl.
*F16D 3/12* (2006.01)
*F16D 3/14* (2006.01)
(Continued)

(52) U.S. Cl.
CPC ............. *F16D 3/12* (2013.01); *F16D 3/14* (2013.01); *F16D 3/80* (2013.01); *F16D 35/02* (2013.01); *F16F 15/173* (2013.01)

(58) Field of Classification Search
CPC ...... F16D 3/12; F16D 3/14; F16D 3/80; F16D 35/02; F16F 15/173
See application file for complete search history.

(56) References Cited

U.S. PATENT DOCUMENTS 1,159,052 A * 11/1915 Leblanc ................ F16F 15/173
74/573.1
1,209,730 A * 12/1916 Leblanc ................ F16F 15/173
74/573.1

(Continued)

FOREIGN PATENT DOCUMENTS

GB 794301 A * 4/1958 ............ F16F 15/173
JP S60-8544 U 1/1985

(Continued)

*Primary Examiner* — Thomas C Diaz
(74) *Attorney, Agent, or Firm* — Oyen Wiggs Green & Mutala LLP

(57) ABSTRACT

A viscous damper has an inertial mass in the form of a tubular member that is applicable for dissipating (removing) destructive torsional vibration in power transmitting shaft assemblies. A viscous fluid contained between moving surfaces is sheared, thereby producing frictional heat which is then allowed to transfer across the moving surfaces to the ambient surroundings. Surfaces of the inertial mass and housing are arranged with respect to each other to provide high shear rate and energy dissipation (damping) is obtained within a small volume.

15 Claims, 7 Drawing Sheets

(51) Int. Cl.
*F16D 3/80* (2006.01)
*F16D 35/02* (2006.01)
*F16F 15/173* (2006.01)

(56) References Cited

U.S. PATENT DOCUMENTS

| | | | |
|---|---|---|---|
| 2,514,136 A * | 7/1950 | O'Connor | F16F 15/173 |
| | | | 74/573.1 |
| 3,495,459 A * | 2/1970 | McLean | F16F 15/173 |
| | | | 74/573.12 |
| 3,603,172 A | 9/1971 | Hall | |
| 3,992,963 A | 11/1976 | Khanna | |
| 4,660,436 A | 4/1987 | Davoust et al. | |
| 6,662,683 B1 | 12/2003 | Takahashi et al. | |
| 2002/0109386 A1 | 8/2002 | Kojima et al. | |
| 2005/0077664 A1 | 4/2005 | Mochimaru et al. | |
| 2007/0240959 A1 | 10/2007 | Knowles | |
| 2014/0231197 A1 | 8/2014 | Watanabe et al. | |

FOREIGN PATENT DOCUMENTS

| | | |
|---|---|---|
| JP | H03-1342 U | 1/1991 |
| JP | H05-6241 U | 1/1993 |
| JP | 2004-278580 A | 10/2004 |

* cited by examiner

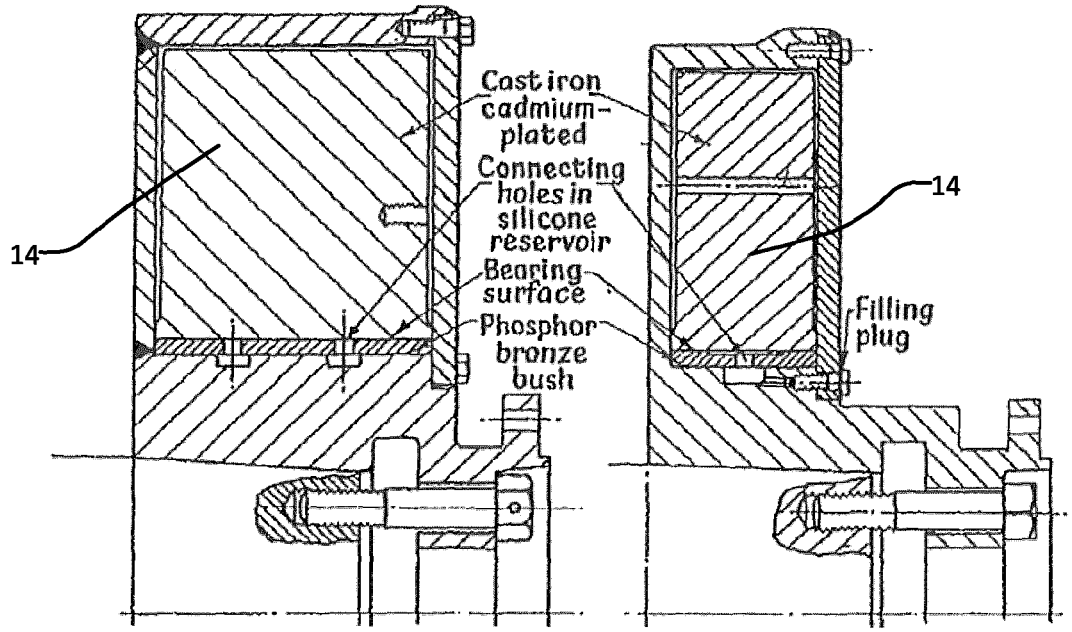
FIG. 1C PRIOR ART
FIG. 1D PRIOR ART
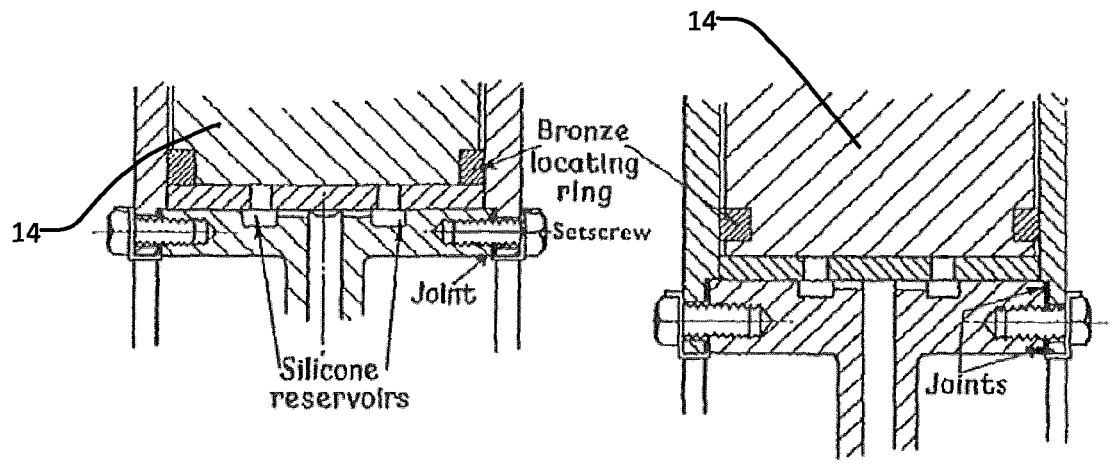
FIG. 1E PRIOR ART
FIG. 1F PRIOR ART

HIGH ENERGY DISSIPATION TORSIONAL VISCOUS DAMPER

CROSS-REFERENCE TO RELATED APPLICATIONS

This application claims the benefit under 35 U.S.C. § 119 of U.S. Patent Application No. 62/495,503 filed 16 Sep. 2016 and entitled HIGH ENERGY DISSIPATION TORSIONAL VISCOUS DAMPER which is hereby incorporated herein by reference for all purposes.

FIELD

This invention relates to viscous dampers for damping vibrations in rotating machine components.

BACKGROUND

Modern high-speed rotating machinery can be subject to damaging vibration due to unbalanced forces, inertia forces from reciprocating parts, and forces due to misalignment, amongst other causes. These types of mechanical vibration are well-understood and have many well-known remedies (see for example Vance, J. et al., "Machinery Vibration and Rotordynamics", Wiley, N.J., 2010).

Lesser known, and not as well understood is so-called torsional vibration. Torsional vibration is a twisting action on rotating components such as shafts in rotating machinery including but not limited to compressors, engines and motors. The twisting results for example, from inertial forces due the reciprocating pistons in compressors or engines, or the fluctuating forces from ships propellers. Torsional vibration is sometimes called the "silent killer" for rotating machinery, as it cannot be easily detected during operation (Urban, J. et al., "Tracking the silent killer", Compressor Tech 2, pp. 24-26, January-February 2010). Over time, torsional vibration in a rotating part such as a motor shaft or crankshaft can cause the part to break due to metal fatigue (the common "paper clip" example).

Problems with torsional vibration can sometimes be avoided or reduced by careful design of a drive system. For example, installing a low torsional stiffness coupling between a driver and driven parts can isolate the harmful torsional vibration between parts. As another example, a damper, or energy dissipating device, can reduce torsional vibration amplitudes by converting the rotational kinetic energy of the vibration into heat. This is analogous to the way that the frictional force applied by brakes can reduce the linear kinetic energy of an automobile.

A common torsional vibration damper is the so-called "untuned viscous damper", originally developed in the early 1900's. An untuned viscous damper acts by shearing a thin liquid film placed between the vibrating parts, thereby turning the "frictional" force into heat and reducing the torsional twisting amplitudes (Ker Wilson, W., "Torsional Vibration Problems", v. 4, $3^{rd}$ ed. Chapman Hill, UK, 1986, p. 361).

FIGS. 1A to 1D illustrate some prior art torsional vibration dampers. FIGS. 1E and 1F show some typical details of construction. The major operating parts are an external damper housing 12, a damper internal disc 14 that is able to rotate relative to housing 12, and a gap 18 between housing 12 and disc 14, which is filled with a suitably viscous fluid. Housing 12 is installed on a rotating and torsionally vibrating driveline shaft at a location on the shaft where amplitude of the torsional vibration (angular oscillation) is greatest. Housing 12 thereby rotates with the shaft and experiences the torsional vibration. Internal disc 14 is designed to have a sufficiently high polar moment of inertia that it rotates at a substantially constant rotational speed. In the presence of torsional vibration, there is therefore a velocity difference between housing 12 and disc 14. This velocity difference creates a shearing action on the fluid contained in gap 18. The shearing action resists the torsional vibrations and thereby damps the torsional vibration amplitudes. Frictional forces in the fluid generate heat which carries energy away from the torsional vibrations.

SUMMARY

This invention has a number of aspects including:
vibration dampers;
methods for damping torsional vibrations in rotating elements.

One aspect provides a viscous damper for damping torsional vibrations, the viscous damper comprising: a housing assembly; and an inertia tube disposed within the housing assembly and rotatable with respect to the housing assembly. A viscous fluid is disposed within the housing assembly and is in contact with surfaces of the inertia tube and the housing. The inertia tube may be characterized by one or more of the following:
having a thickness, $r_o$-$r_i$, that is less than one tenth of the outer radius;
having a length, t, that is greater than the thickness of the inertia tube;
approaching the 'thin shell approximation' to within 10% or 5% or 1%;
having a ratio β as defined below having a value of at least one of the thresholds for β defined below;
having a ratio Γ as defined below having a value of at least one of the thresholds for Γ defined below;
having a ratio Λ as defined below having a value of at least one of the thresholds for Λ defined below; and/or
having a ratio Ψ as defined below having a value of at least one of the thresholds for Ψ defined below.

A spring may optionally be coupled between the inertia tube and the housing. The spring may exert a restoring force on the inertia tube when the inertia tube is rotated relative to the housing away from a neutral position to provide a tuned damper.

Another aspect of the invention provides a method for damping torsional vibration of an element that rotates about an axis. The method comprises providing a housing coupled to the element and enclosing an inertia tube as described herein. The inertia tube is concentric with and rotatable about the axis. The method involves viscously coupling the inertia tube to rotate with the housing.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIGS. 1A through 1F illustrate conventional untuned viscous dampers.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Improvement Needed

The inventors have determined that prior art torsional vibration dampers such as those shown in FIGS. 1A to 1F are subject to various problems, some of which are described below.

1. Excessive Local Operating Fluid Temperatures

Figures 1A, 1B:
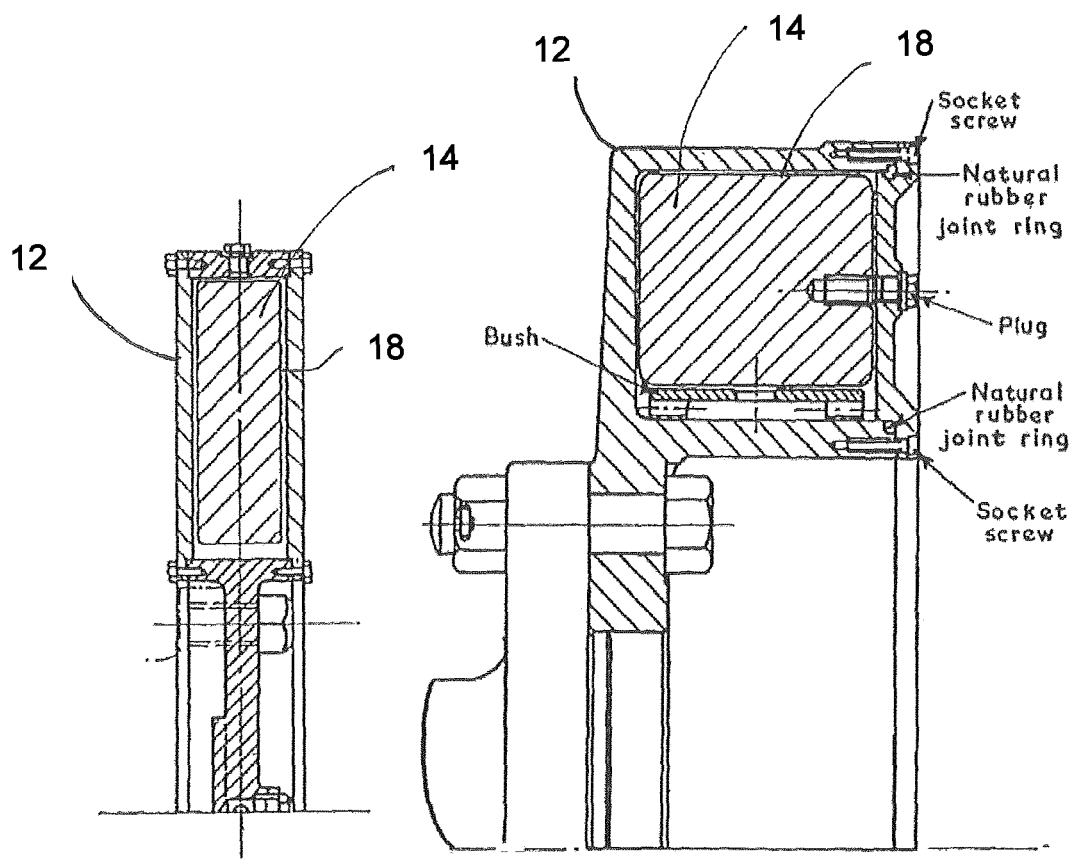
Figure 6:
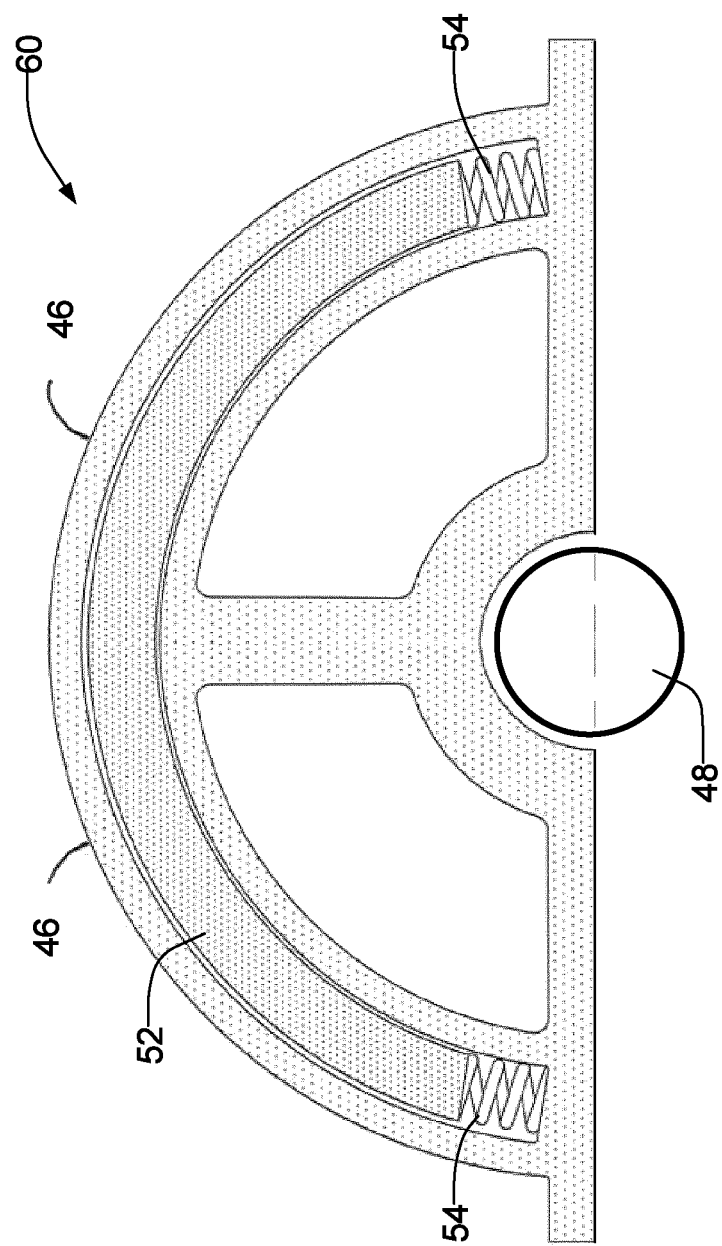
FIG. 6 is a cross-section view of one half of a tuned viscous damper.

FIGS. 1A to 1D show details of construction of untuned viscous dampers each having a disc 14 that is larger in diameter than in axial width; ratios of disc diameter to width typically range from 12:1, as in FIG. 1A, to 6:1 as in FIG. 1B. For the damper shown in FIG. 1A, the inner diameter of the disc is typically ½ the outer diameter. As a rotating disc has surface speed proportional to radius, the outer portion of the disc moves at 2 times the speed of the inner portion when the disc is rotating. It is well-known that the local rate of energy dissipation per unit area is proportional to the square of the velocity difference between the disc and housing (Nestorides, E. J., "Handbook of Torsional Vibration", Cambridge Press, p. 558, 1958). As such, the energy dissipation rate at the outer portion of disc 14 is about 4 times greater than at the inner portion.

As a result of the large variation of energy dissipation from inner to outer radius, the fluid being sheared at the outer radius will be a much higher temperature, potentially leading to overheating, deterioration, and even "burning" of the fluid in that region. Conversely, if the damper gap 18 is adjusted to reduce the shearing so as to keep the fluid temperature at the outer diameter within bounds, most of the remaining region of the damper disc will have much reduced local shearing (damping). Local damping at the inner diameter will be only ¼ of that at the outer diameter, representing a much lower overall damping efficiency for a given damper size.

2. Physical Damper Size and Overall Weight

Disc 14 shown in FIGS. 1A to 1D must have sufficient inertia in order to rotate at a relatively constant angular speed. For this type of disc, a disc with sufficient inertia can become very heavy, placing large bending loads on the supporting motor shaft or compressor crankshaft respectively. It should be noted that polar inertia is increased as the radius of the disc to the $4^{th}$ power (i.e. $r^4$). As in the discussion of the shearing action above, the major portion of the inertia is produced at the outer portions of the disc. The inner portion, while adding weight, adds much less inertia.

3. Surface Area Available for Rejecting Energy being Dissipated

The major portions of the disc shown in FIGS. 1A to 1D responsible for shedding heat to the ambient surroundings are the side faces of disc 14. The area of the disc face is proportional to the radius squared, so that in much the same way as described above, the inner portion provides much less cooling area than the outer. Increasing the disc radius to get better cooling may be impractical and inefficient.

Figure 2A:
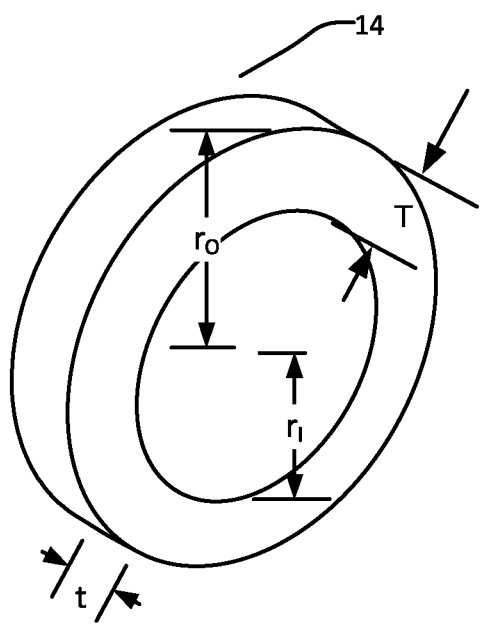
FIG. 2A is a perspective view of an inertial disk of conventional construction showing dimensions that characterize the disc.

FIGS. 1A through 1F show examples of disc-type dampers of types that are in common use. Each Figure is a cross section through one half of a disc-type damper with the other half being mirror symmetrical. FIG. 2A, indicates how an inertial mass such as a disc 14 may be characterized by an outer radius $r_o$, inner radius $r_i$, length t parallel to an axis of rotation of the disc and thickness T.

Figure 2B:
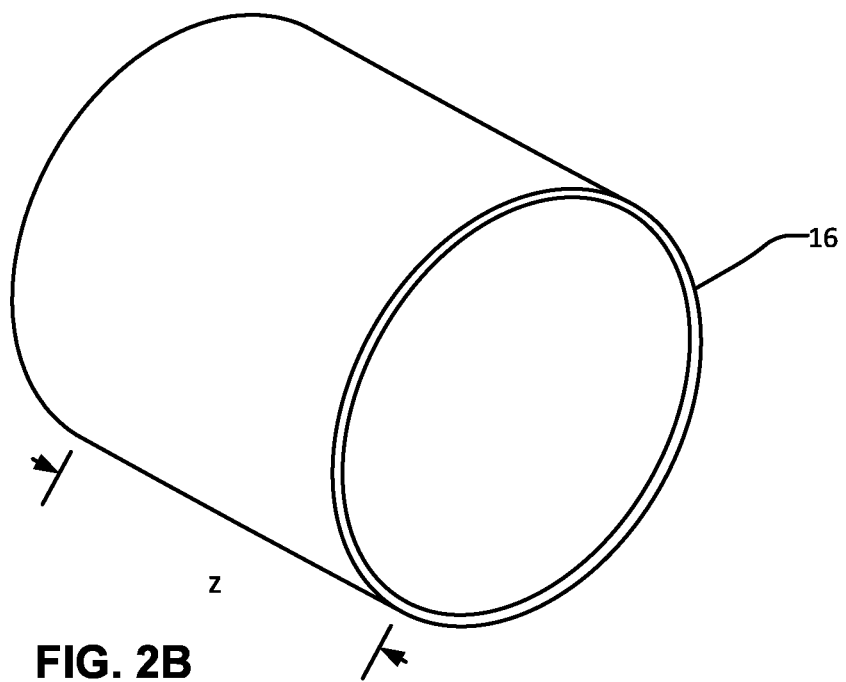
FIG. 2B is a perspective view of an inertial tube of an example embodiment of the invention.

The inventors have discovered that may disadvantages of conventional untuned viscous dampers can be ameliorated by using tube-type inertial masses (called 'inertia tubes' in this disclosure) in place of conventional discs 14. FIG. 2B shows an example tube-type inertial mass or 'inertia tube' 16. Inertia tube 16 differs from discs 14 in that inertia tube 16 has an inner diameter that is closer to the outer diameter. Further, in some cases the length of an inertia tube may be relatively larger in comparison to the thickness of the inertia tube than a conventional disc type inertial mass.

The following example calculations indicate that if the outer diameter of a disc and tube are the same, the length t of the tube is approximately ½ the outer diameter, and the inner radius of the disc is approximately ½ the outer radius of the disc, then imposing the requirement that the tube and disc have the same polar moment of inertia, results in the tube being ⅔ the mass of the disc, while the tubular inertial mass provides 8/3 times greater area for cooling the sheared fluid than the comparable disc.

$$M_D = \rho V = \pi \rho t_D \left(r_o^2 - \left(\frac{1}{2}r_o\right)^2\right)$$

$$= \frac{3}{4}\pi \rho t_D r_0^2$$

$$J_D = \frac{1}{2}\pi \rho t_D (r_0^4 - r_1^4) = \frac{15}{16}\pi \rho t_D r_0^4 \approx \frac{1}{2}\pi \rho t_D r_0^4$$

$$= \frac{2}{3} M_D r_0^2$$

$$M_T = \rho V = \rho(2\pi r_0)(r_0)\left(1 - \frac{r_i}{r_0}\right) t_T$$

$$\approx 2\pi \rho t_T r_0^2$$

$$J_T \approx M_T r_0^2 = 2\pi \rho t_T r_0^4;$$

using the approximation for a thin shelled cylinder.

$$J_T = J_D \Rightarrow \frac{2}{3} M_D r_0^2 \approx M_T r_0^2 \Rightarrow M_T \approx \frac{2}{3} M_D; \text{ and}$$

$$\frac{1}{2}\pi \rho t_D r_0^4 \approx 2\pi \rho t_T r_0^4 \Rightarrow t_T \approx \frac{1}{4} t_D$$

$$A_D \approx 2\pi(r_0^2 - r_1^2) = \frac{3}{2}\pi r_0^2$$

$$A_T \approx 2(2\pi r_0)(r_0) = 4\pi r_0^2$$

$$\frac{A_T}{A_D} \approx \frac{8}{3}$$

where:

$M_D$ is the mass of the disc.
$M_T$ is the mass of the tube.
V is volume;
ρ is the density of the material of both the disc and tube;
$t_D$ is the length of the disc;
$t_T$ is the length of the tube;
$r_0$ is the outer radius of both the tube and the disc;
$r_i$ is the inner radius of the tube;
$J_D$ is the moment of inertia of the disc;
$J_T$ is the moment of inertia of the tube;
$A_D$ is the surface area of the disc; and
$A_T$ is the surface area of the tube;

Using an inertial mass having the form of a thin tube (an inertia tube) rather than a thick disc as the inertial mass in a torsional vibration damper may provide the following effects:

a. Increased moment of inertia for a given weight is gained by a greater part of mass being distributed at the outer periphery of the inertia tube, without the penalty of weight from the less effective inner portions of the disc.
b. Increased shearing rate of the fluid between the inertia tube and its housing occurs at the outer periphery of the inertia tube where the velocity difference will be greatest, without the comparatively lower shearing capability for much of the disc.
c. Maximum cooling area (and convective heat transfer rate) is gained as the inertia tube has more surface area from which to conduct heat.

A vibration damper according to the invention may comprise a tubular inertial mass or inertia tube (e.g. an inertial mass characterized in one or more of the ways described herein) mounted to rotate relative to a housing that provides surfaces spaced apart from inside and outside walls of the inertia tube by gaps containing a viscous fluid. The viscous fluid may, for example, comprise siloxane or silicone. The housing may be attached or mounted to a rotating member in a machine such as a rotating shaft.

Figure 3:
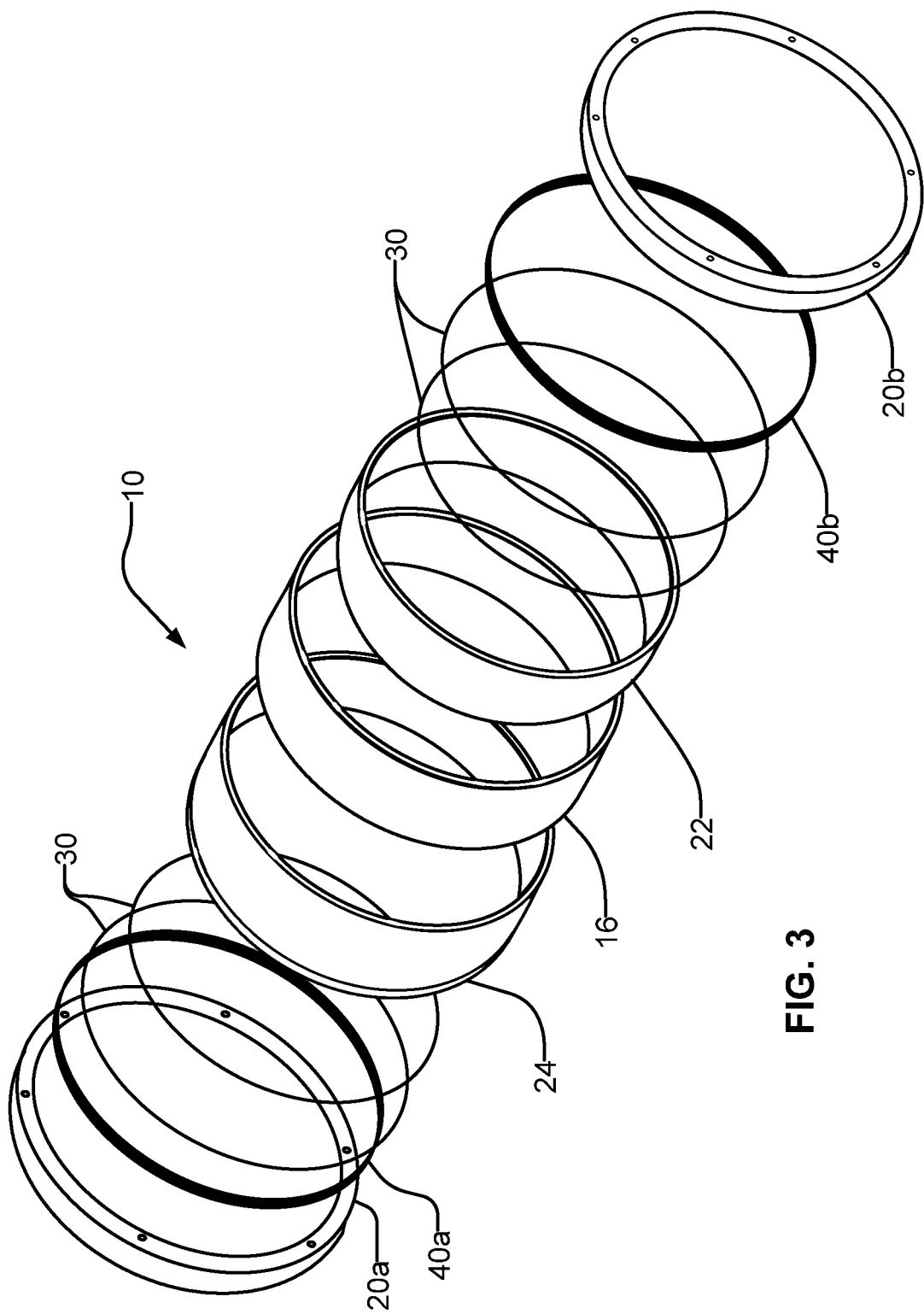
FIG. 3 is an exploded view of the solid components of an untuned viscous damper in an embodiment of the invention.
Figure 4:
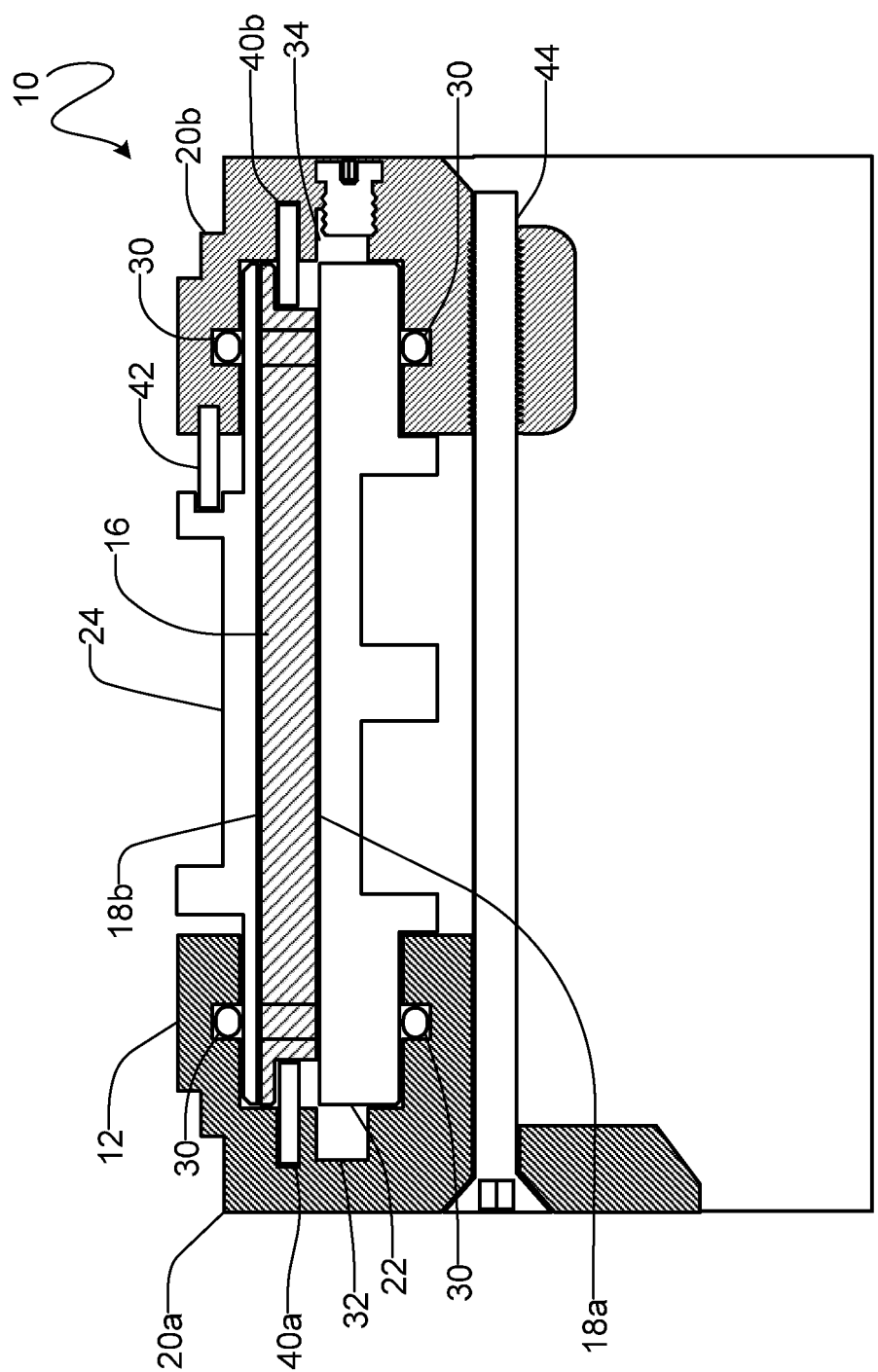
FIG. 4 is a cross-section view of an untuned viscous damper according to an example embodiment of the invention.

An example high energy tube-type viscous damper 10 is shown in FIGS. 3 and 4. First and second end caps 20a and 20b form the ends of the housing assembly 12. Inner sleeve 22 fits concentrically into outer sleeve 24. An inertia tube 16 fits concentrically between inner sleeve 22 and outer sleeve 24. The clearance between the inertia tube 16 and each of the inner sleeve 22 and outer sleeve 24 forms inner and outer gaps 18a and 18b respectively (see FIG. 4). Shearing of a viscous fluid provided in inner and outer gaps 18a, 18b may be increased by making the inner and outer gaps different, filling them with different fluids, and/or making any of the surfaces on either side of either of these gaps patterned with grooves, recesses, or projections.

When viscous damper 10 is assembled, inner and outer gaps 18a and 18b are filled with a viscous fluid such as siloxane or silicone. End caps 20a and 20b fit against each axial end of the concentric inner and outer sleeve 22 and 24. Seals such as O-rings 30 retain the fluid. For example O-rings 30 fit into slots between the inner sleeve 22 and each end cap 20a and between the outer sleeve 24 and each end cap 20b (see FIG. 4). O-rings 30 assist in preventing leaking of high-viscosity fluid from between the end caps and the sleeves. Bearings 40a and 40b are fit between the inertia tube and the respective end caps 20a and 20b (see FIG. 4).

Because of the form of inertia tube 16, for a given outside diameter of a viscous damper using an inertia tube 16 as an inertial element, the part of the housing that defines inner gap 18a (inner sleeve 22 in the illustrated embodiment) may have a greater diameter than the corresponding part in a conventional viscous damper.

FIG. 4 is a cross-section view of an example viscous damper device 10. Inner and outer gaps 18a and 18b are filled with a suitable high viscosity fluid. End cap 20a has a reservoir 32 which can provide fluid to the gaps 18a and 18b, thereby overcoming a modest loss of fluid by leaks. Each of inner and outer gaps 18a and 18b are in fluid communication with reservoir 32 and an expansion chamber 34.

During operation the viscous fluid in the gaps 18a and 18b will become warmer due to the fluid shearing action. Typically, the high viscosity fluids suitable for use in a damper are long-chain polymers such as "siloxane" (polydimethylsiloxane), which have volumetric expansion coefficients greater than that of the housing, which may, for example, be made of steel or aluminum. Expansion chamber 34 allows for fluid expansion and thereby keeps the fluid pressure within housing 12 from becoming excessive. In the illustrated embodiment expansion chamber 34 is formed in end cap 20b.

Viscous damper 10 may allow for better cooling such that the thickness of inner and outer gaps 18a and 18b may be larger as compared to conventional torsional vibration dampers (such as those depicted in FIGS. 1A-1F). In some embodiments, inner and outer gaps 18a and 18b may be three to five times larger than those of conventional torsional vibration dampers. In some embodiments, inner and outer gaps 18a and 18b may be ten times larger than those of conventional torsional vibration dampers. By increasing the thickness of inner and outer gaps 18a and 18b, torsional vibration damping may be increased and fabrication of viscous damper 10 may be simplified, thereby reducing costs.

Housing 12 is sealed to prevent leakage of the viscous fluid in the gaps 18a and 18b by O-ring seals 30. In order to keep the inertia tube 16 within axial center during operation, and also to keep the inertia tube 16 and housing 12 concentric, inertia tube 16 is supported to rotate about its axis relative to housing 12 by bearings 40a and 40b. Bearings 40a and 40b may, for example comprise suitable bushings, roller bearings, needle bearings, ball bearings or the like. One or more dowel pins 42b may be provided to ensure that the outer sleeve will not rotate along with inertia tube 16.

The increased surface area relative to mass of inertia tube 16 in some embodiments may allow for increased effective cooling surface from which to dissipate heat generated by the shearing of the viscous fluid. The increased effective cooling of the viscous fluid may allow the use of higher viscosity fluids with greater sensitivity to temperature variation.

In some embodiments inertia tube 16 of the viscous damper is characterized by one or more of the following:
  having a thickness, $r_0 - r_i$, that is less than one tenth of the outer radius;
  having a length, t, that is greater than the thickness of the inertia tube;
  approaching the 'thin shell approximation' to within 10% or 5% or 1%;
  having a ratio β as defined below having a value of at least one of the thresholds for β defined below;
  having a ratio Γ as defined below having a value of at least one of the thresholds for Γ defined below;
  having a ratio Λ as defined below having a value of at least one of the thresholds for Λ defined below; and/or
  having a ratio Ψ as defined below having a value of at least one of the thresholds for Ψ defined below.

In an embodiment the viscous damper may be characterized as having an inertia tube that approaches the thin shell approximation for a cylinder. The thin shell approximation is defined by a cylinder wherein the inner radius is approximately equal to the outer radius. For a general cylinder, the moment of inertia is $$J = \tfrac{1}{2} M(r_o^2 + r_i^2)$$

where:
J is the moment of inertia of the cylinder.
M is the mass of the cylinder
$r_o$ is the outer radius of the cylinder.
$r_i$ is the inner radius of the cylinder.
The thin shell approximation then provides a moment of inertia of $$J = M r_o^2$$

Therefore, the ratio $$\beta = \frac{J}{M r_o^2} = \frac{1}{2}\left(1 + \frac{r_i^2}{r_o^2}\right)$$

approaches the value of 1 in the limit as $r_i$ approaches $r_o$. Physically, the ratio, β for fixed $r_o$, represents how efficiently mass contributes to the moment of inertia. Since the contribution of mass to the moment of inertia is proportional to the square of the distance from the axis of rotation, the moment of inertia is maximized for a given mass if the mass is furthest from the axis. In the thin shell approximation all of the mass is equally far from the axis. In some embodiments the inertia tube is characterized by values of β of at least 0.75, 0.85, 0.90, 0.95, 0.97, 0.99, or more.

In some embodiments the inertia tube is characterized by the ratio of the sum of the surface area of the interior and exterior faces of the cylinder (the radial faces) with the sum of the surface area of the end faces (the axial faces) of the inertia tube, $$\Gamma = \frac{A_r}{A_z} = \frac{2\pi r_o z + 2\pi r_i z}{2\pi (r_o^2 - r_i^2)} = \frac{z}{r_0 - r_i}$$

where:
$A_r$ is the surface area of the radial faces of the cylinder;
$A_z$ is the surface area of the axial faces of the cylinder; and
z is the length of the cylinder.
This ratio is equal to the ratio of length to thickness, since $r_0 - r_i$ is the thickness of the tube. In some embodiments the inertial disk is characterized by values of Γ of at least 1.5, 2, 3, 5, 10, 20 or more.

In some embodiments the inertial disk is characterized by a ratio of surface area to mass. The surface area of a cylinder is $$A_c = 2\int_{r_i}^{r_0}\!\!\int_0^{2\pi} r\, d\theta dr + \int_0^z\!\!\int_0^{2\pi} r\, d\theta dr\big|_{r_0} + \int_0^z\!\!\int_0^{2\pi} r\, d\theta dz\big|_{r_i}$$

$$A_c = 2\pi(r_o^2 - r_i^2) + 2\pi z(r_o + r_i) = 2\pi(z + r_o - r_i)(r_o + r_i)$$

such that a ratio, Λ, may be calculated $$\Lambda = \frac{r_o A_c}{2M} = \frac{r_o A_c}{2\rho V} = \frac{2\pi r_o (r_o^2 - r_i^2) + 2\pi z(r_o + r_i)}{2\pi \rho z (r_o^2 - r_i^2)}$$

-continued $$\Lambda = \rho^{-1}\left(\frac{r_o}{z} + \frac{r_o}{r_o - r_i}\right)$$

The ratio, Λ, provides a representation of the available surface area for cooling per unit of mass of the disc. The additional factor of $r_o$ is applied to make the ratio a scalar for fixed density An inertia tube characterized by a higher value of Λ provides greater cooling per unit of mass. In some embodiments of the invention the inertia tube is characterized by values of Λ of at least $15\rho^{-1}$, $20\rho^{-1}$, $50\rho^{-1}$, $100\rho^{-1}$, or more.

Since energy dissipation for a viscous damper is proportional to the square of the velocity and the velocity at any point on a spinning disk is proportional to the radius at that point, the energy dissipation for a viscous damper at a point is proportional to the square of the radius. The energy dissipation at a point may be represented as $U(r) = r^2 f$, where the function $f$ is not dependent on spatial parameters. A ratio, Ψ, which represents an approximation of the effective energy dissipation by unit mass adjusted by a factor of $r_0$, can be defined such that $$\Psi = \frac{2\int_{r_i}^{r_0}\!\!\int_0^{2\pi} U(r) r\, d\theta dr + \int_0^z\!\!\int_0^{2\pi} U(r) r\, d\theta dz\big|_{r_0} + \int_0^z\!\!\int_0^{2\pi} U(r) r\, d\theta dz\big|_{r_i}}{M f r_o}$$

The additional factor of $r_0^{-1}$ is applied to make the ratio a scalar when the density is fixed. Since the function $f$ is a positive, non-zero function which is not dependent on spatial parameters it may be factored out and cancelled.

$$\Psi = \frac{2\int_{r_i}^{r_0}\!\!\int_0^{2\pi}(r^2) r\, d\theta dr + \int_0^z\!\!\int_0^{2\pi}(r^2) r\, d\theta dr\big|_{r_0} + \int_0^z\!\!\int_0^{2\pi}(r^2) r\, d\theta dz\big|_{r_i}}{2\pi \rho z r_o (r_o^2 - r_i^2)}$$

$$= \frac{\pi r_o^4 - \pi r_i^4 + 2\pi z r_o^3 + 2\pi z r_i^3}{2\pi \rho z r_o (r_o^2 - r_i^2)} = \frac{r_o^4 - r_i^4 + 2 z r_o^3 + 2 z r_i^3}{2\rho z r_o (r_o^2 - r_i^2)}$$

$$= \rho^{-1}\left(\frac{r_o^2 + r_i^2}{2 z r_o} + \frac{r_o^2 - r_o r_i + r_i^2}{r_o (r_o - r_i)}\right)$$

In some embodiments of the invention the inertial disc is characterized by values of Ψ of at least $15\rho^{-1}$, $20\rho^{-1}$, $40\rho^{-1}$, $75\rho^{-1}$, $100\rho^{-1}$ or more.

In some embodiments an inertia tube may be characterized by two or more of the above ratios. For example, in an embodiment an inertia tube may have a value of β of 0.96, and a value of Λ of $26.49\rho^{-1}$.

Alternative Arrangements

Many other arrangements can be devised to form a housing and to support a tube-type inertial mass as described above in the housing in order to achieve practical embodiments of a novel tube-type damper. For example, the housing may be cast in a U-shaped form with a single end cap. Different combinations of materials may be used to minimize thermal expansion effects. Different arrangements may be provided to couple the viscous damper to a rotating element of a machine.

Figure 5A:
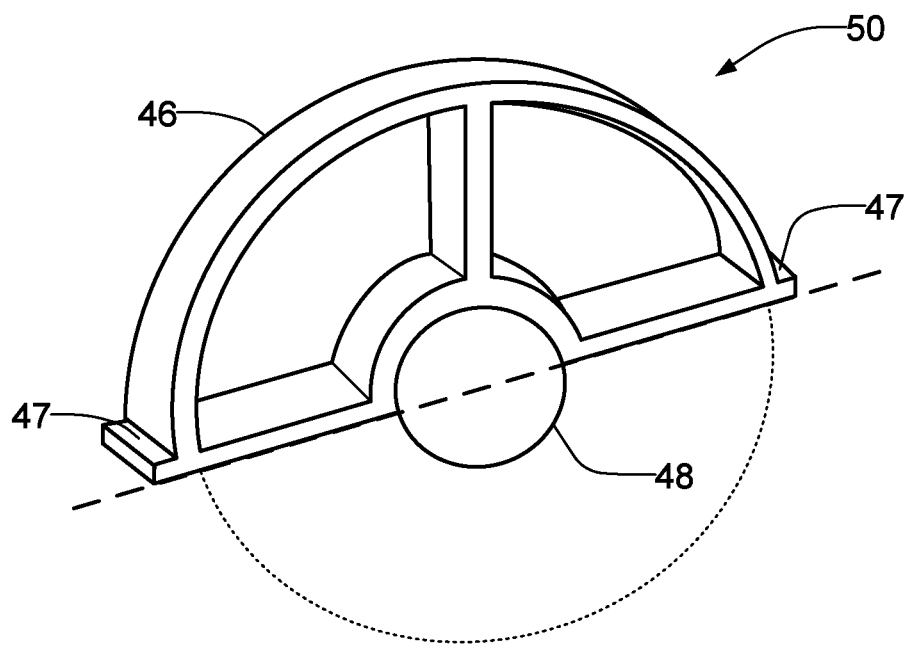
FIG. 5A is a perspective view of one half of a viscous damper according to an example embodiment of the invention.
Figure 5B:
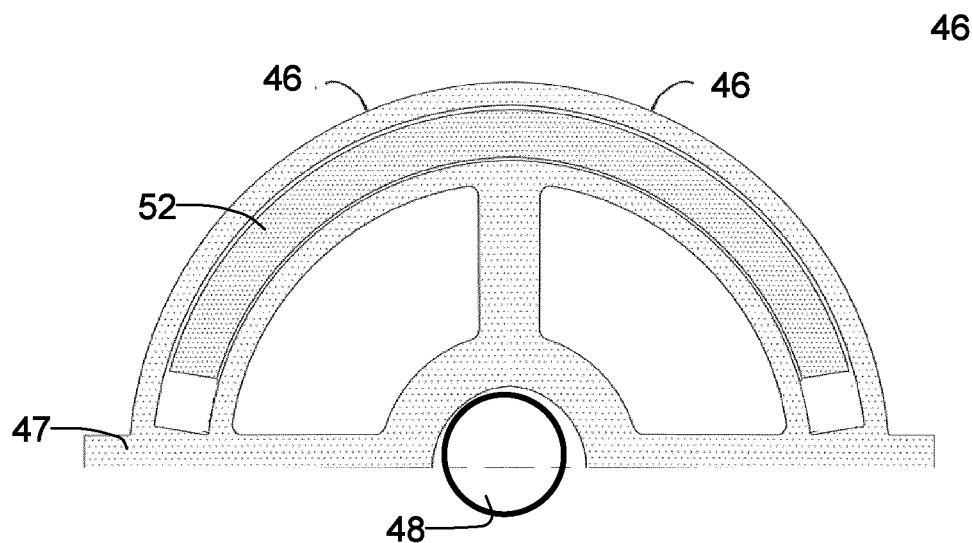
FIG. 5B is a cross-section view of one half of the viscous damper of FIG. 5A.

In addition to choices for materials and design details of tube-type dampers which are obvious in light of the present disclosure, all of which would employ the novelty claimed herein, slightly different arrangements may be derived from the tube-type principle. For example, FIGS. 5A and 5B show an example damper 50 that is adapted to facilitate attaching the damper around an existing shaft. Damper 50 is split along its axis to form two cylindrical half-shells 46 (one of which is shown in FIG. 5). The two shells 46 may be suitably joined after placement around shaft 48 into a tube-type damper once again. A half-inertia tube 52 may be provided within each cylindrical half-shell 46. Viscous fluid may be provided in the gaps between half-inertia tube 52 and half-shell 46 such that shearing of the viscous fluid between half-inertia tube 52 and half-shell 46 reduces torsional vibration as discussed in relation to viscous damper 10. Flanges 47 of opposing cylindrical half-shells 46 may be, for example, clamped together using any suitable clamp, fastened together using any suitable fastener or fixed together by, for example, welding.

In another alternative embodiment, as shown in FIG. 6, damper 50 is modified to operate as a so-called tuned viscous damper 60 by addition of a suitable spring connection 54 between half-shell 46 and half-inertia tube 52. Springs 54 may apply a force that tends to restore half-inertia tube 52 to a neutral rotational position relative to half shell 46. Springs 54 may work in conjunction with viscous fluid provided in the gaps between half-inertia-tube 52 and half-shell 46 to reduce torsional vibration. In particular, springs 54 may serve to improve damping for a particular frequency, as desired, by adjusting the spring constant of one or both of springs 54.

Prototype Test and Performance

A prototype tube-type damper having the approximate dimensions of: outer diameter 22 in., length 6 in., inertia tube thickness 0.34 in. and fluid gap 0.040 in, was made and tested. The inertia tube in the prototype had approximate ratios of $\beta=0.970$, $\Gamma=17.65$, $\Lambda=34.19\rho^{-1}$, $\Psi=33.16\rho^{-1}$.

During operation with the housing rotating steadily at approximately 1,500 RPM, the inertia tube vibration of the prototype was measured to be approximately 50 Hz, with angular amplitude relative to the rotating housing of +/−0.6 degrees. The energy dissipation rate was determined to be approximately 0.8 kW, a surprisingly high and very effective rate for a damper with the dimensions given. In all, the novel arrangement can be said to meet all the goals stated and provides a significant advancement over the common disc-type damper.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A viscous damper for damping torsional vibrations comprising:
    a housing assembly;
    an inertia tube disposed within the housing assembly and rotatable with respect to the housing assembly; and
    a viscous fluid disposed within the housing assembly, the viscous fluid at least partially enveloping the inertia tube;
    wherein the inertia tube has an inner radius, $r_i$, an outer radius, $r_o$, a length, z, and a density, p, and the inertia tube is characterized by a ratio, $$\Psi = \rho^{-1}\left(\frac{r_o^2 + r_i^2}{2zr_o} + \frac{r_o^2 - r_o r_i + r_i^2}{r_o(r_o - r_i)}\right);$$

and $\Psi$ is greater than or equal to $15\rho^{-1}$.

2. The viscous damper of claim 1 wherein the inertia tube has a thickness and the length is at least 10 times greater than the thickness.

3. The viscous damper of claim 1 wherein the inertia tube is fully enveloped in the viscous fluid.

4. The viscous damper of claim 1 wherein the housing assembly comprises:
    a first end cap;

a second end cap;
an inner sleeve; and
an outer sleeve.

5. The viscous damper of claim 1 wherein the inertia tube is supported for rotation relative to the housing by a first bearing and a second bearing, each of the first and second bearings disposed within the housing assembly at first and second axial ends of the inertia tube respectively.

6. The viscous damper of claim 1 wherein the inertia tube and housing each comprise a plurality of sections connectable to mate together around a shaft or other rotatable machine element.

7. The viscous damper of claim 6 further comprising a spring having a first end and a second end, the first end of the spring fixed to the inertia tube and the second end of the spring coupled to the housing assembly.

8. The viscous damper of claim 7 wherein the spring is disposed to apply a force that tends to restore the inertia tube to a neutral rotational position relative to the housing.

9. The viscous damper of claim 1 wherein the inertia tube is characterized by a thickness, and the thickness is less than one tenth of the outer radius.

10. The viscous damper of claim 1 wherein the inertia tube is further characterized by a ratio, $$\beta = \frac{1}{2}\left(1 + \frac{r_i^2}{r_o^2}\right);$$

and $\beta$ is greater than or equal to 0.90.

11. The viscous damper of claim 1 wherein the inertia tube is further characterized by a ratio, $$\Gamma = \frac{z}{r_0 - r_i};$$

and $\Gamma$ is greater than or equal to 15.

12. The viscous damper of claim 1 wherein the inertia tube is further characterized by a ratio, $$\Lambda = \rho^{-1}\left(\frac{r_o}{z} + \frac{r_o}{r_o - r_i}\right);$$

and $\Lambda$ is greater than or equal to $30\rho^{-1}$.

13. The viscous damper of claim 1 comprising a spring connected between the housing and the inertia tube to form a tuned viscous damper.

14. The viscous damper of claim 1 wherein the inertia tube is separated from the housing assembly by an inner gap radially inward from an inner surface of the inertia tube and an outer gap radially outward from an outer surface of the inertia tube and the inner and outer gaps are filled with the viscous fluid.

15. The viscous damper of claim 14 wherein the inner and outer gaps are different.

* * * * *